United States Patent
Guo et al.

(10) Patent No.: US 6,449,131 B2
(45) Date of Patent: Sep. 10, 2002

(54) CANTED LONGITUDINAL PATTERNED EXCHANGE BIASED DUAL-STRIPE MAGNETORESISTIVE (DSMR) SENSOR ELEMENT AND METHOD FOR FABRICATION THEREOF

(75) Inventors: Yimin Guo, San Jose; Kochan Ju, Fremont; Po-Kang Wang; Cherng-Chyi Han, both of San Jose; Hui-Chuan Wang, Pleasanton, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/818,963

(22) Filed: Mar. 28, 2001

Related U.S. Application Data

(62) Division of application No. 09/182,761, filed on Oct. 30, 1998, now Pat. No. 6,230,390.

(51) Int. Cl.$^7$ ................................................. G11B 5/39
(52) U.S. Cl. ................................. 360/315; 360/327.32
(58) Field of Search .............................. 360/315, 317, 360/318, 314, 327.3, 327.31, 327.32

(56) References Cited

U.S. PATENT DOCUMENTS

| | | | |
|---|---|---|---|
| 5,285,339 A | 2/1994 | Chen et al. | 360/113 |
| 5,309,305 A * | 5/1994 | Nepela et al. | 360/113 |
| 5,325,253 A | 6/1994 | Chen et al. | 360/113 |
| 5,406,433 A | 4/1995 | Smith | 360/113 |
| 5,508,866 A | 4/1996 | Gill et al. | 360/113 |
| 5,592,082 A | 1/1997 | Kuriyama | 324/252 |
| 5,680,281 A | 10/1997 | Kung et al. | 360/113 |
| 5,684,658 A * | 11/1997 | Shi et al. | 360/113 |
| 5,696,654 A * | 12/1997 | Gill et al. | 360/113 |
| 5,706,151 A * | 1/1998 | Smith | 360/113 |
| 5,719,730 A * | 2/1998 | Chang et al. | 360/113 |
| 5,766,780 A * | 6/1998 | Huang et al. | 428/682 |
| 6,204,071 B1 * | 3/2001 | Ju et al. | 438/3 |
| 6,230,390 B1 * | 5/2001 | Guo et al. | 29/603.14 |
| 6,278,594 B1 * | 8/2001 | Engel et al. | 360/325 |
| 6,291,087 B1 * | 9/2001 | Xiao et al. | 428/692 |
| 6,310,751 B1 * | 10/2001 | Guo et al. | 360/315 |

OTHER PUBLICATIONS

Ashar, Magnetic Disk Drive Technology: Heads, Media, Channel, Interfaces and Integration, IEEE, Inc., New York, 1997, pp. 142–146.

* cited by examiner

*Primary Examiner*—Brian E. Miller
(74) *Attorney, Agent, or Firm*—George O. Saile; Stephen B. Ackerman

(57) ABSTRACT

A dual stripe magnetoresistive (DSMR) sensor element, and a method for fabricating the dual stripe magnetoresistive (DSMR) sensor element. When fabricating the dual stripe magnetoresistive (DSMR) sensor element while employing the method, there are employed two pair of patterned magnetic biasing layers formed of a single magnetic biasing material. The two pair of patterned magnetic biasing layers bias a pair of patterned magnetoresistive (MR) layers in a pair of opposite canted directions. The method employs multiple thermal annealing methods one of which employs a thermal annealing temperature, a thermal annealing exposure time and an extrinsic magnetic bias field such that a first pair of transversely magnetically biased patterned magnetic biasing layers is not substantially demagnetized when forming a second pair of transversely magnetically biased patterned magnetic biasing layers of anti-parallel transverse magnetic bias direction to the first pair of transversely magnetically biased patterned magnetic biasing layers.

6 Claims, 4 Drawing Sheets

CANTED LONGITUDINAL PATTERNED EXCHANGE BIASED DUAL-STRIPE MAGNETORESISTIVE (DSMR) SENSOR ELEMENT AND METHOD FOR FABRICATION THEREOF

This is a division of Patent Application Ser. No. 09/182,761, now U.S. Pat. No. 6,230,390, filing date Oct. 30, 1998, Canted Longtudinal Patterned Exchange Biased Dual-Stripe Magnetoresistive (Dsmr) Sensor Element and Method for Fabrication Thereof, assigned to the same assignee as the present invention.

BACKGROUND OF THE INVENTION

1. Field of the Invention

The present invention relates generally to methods for fabricating magnetic sensor elements. More particularly, the present invention relates to methods for fabricating dual stripe magnetoresistive (DSM) sensor elements with enhanced signal amplitudes.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically determined as areal storage density of a magnetic data storage medium formed upon a rotating magnetic data storage disk within a direct access storage device (DASD) magnetic data storage enclosure. The areal storage density of the magnetic data storage medium is determined largely by the track width, the track spacing and the linear magnetic domain density within the magnetic data storage medium. The track width, the track spacing and the linear magnetic domain density within the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium; and (3) the separation distance of the magnetic read-write head from the magnetic data storage medium.

With regard to the magnetic read-write characteristics of magnetic read-write heads employed in reading and writing digitally encoded magnetic data from and into a magnetic data storage medium, it is known in the art of magnetic read-write head fabrication that magnetoresistive (MR) sensor elements employed within magnetoresistive (MR) read-write heads are generally superior to other types of magnetic sensor elements when employed in retrieving digitally encoded magnetic data from a magnetic data storage medium. In that regard, magnetoresistive (MR) sensor elements are generally regarded as superior since magnetoresistive (MR) sensor elements are known in the art to provide high output digital read signal amplitudes, with good linear resolution, independent of the relative velocity of a magnetic data storage medium with respect to a magnetoresistive (MR) read-write head having the magnetoresistive (MR) sensor element incorporated therein. Within the general category of magnetoresistive (MR) sensor elements, dual stripe magnetoresistive (DSMR) sensor elements, and in particular longitudinal patterned exchange biased dual stripe magnetoresistive (DSMR) sensor elements, are presently of considerable interest insofar as the multiple magnetically biased magnetoresistive (MR) layers employed within longitudinally patterned exchange biased dual stripe magnetoresistive (DSMR) sensor elements typically provide enhanced magnetic read signal amplitude and fidelity in comparison with, for example, soft adjacent layer (SAL) magnetoresistive (MR) sensor elements.

While longitudinal patterned exchange biased dual stripe magnetoresistive (DSMR) sensor elements are thus desirable within the art of digitally encoded magnetic data storage and retrieval, longitudinal patterned exchange biased dual stripe magnetoresistive (DSMR) sensor elements are nonetheless not entirely without problems within the art of digitally encoded magnetic data storage and retrieval. In particular, as a data track width within a magnetic medium employed within digitally encoded magnetic data storage and retrieval decreases, it becomes increasingly important that a read track width within a longitudinal patterned exchange biased dual stripe magnetoresistive (DSMR) sensor element employed in reading the data within the data track be uniformly magnetically biased. Uniform magnetic bias profiles are desirable within read track widths of longitudinal patterned exchange biased dual stripe magnetoresistive (DSMR) sensor elements since such uniform magnetic bias profiles provide for optimal magnetic read signal amplitudes within such longitudinal patterned exchange biased dual stripe magnetoresistive (DSMR) sensor elements.

It is thus towards the goal of providing, for use within magnetic data storage and retrieval, a longitudinal patterned exchange biased dual stripe magnetoresistive (DSMR) sensor element with a uniform magnetic bias profile across a read track width of the longitudinal patterned exchange biased dual stripe magnetoresistive (DSMR) sensor element that the present invention is most generally directed.

Various methods and resultant magnetic sensor element structures have been disclosed in the art of magnetic sensor element fabrication for forming magnetically biased magnetic sensor elements with enhanced functionality, enhanced reliability or other desirable properties.

For example, general considerations pertinent to both intrinsic and extrinsic longitudinal magnetic biasing of magnetoresistive (MR) layers within magnetoresistive (MR) sensor elements, including but not limited to dual stripe magnetoresistive (DSMR) sensor elements, are disclosed within Ashar, Magnetic Disk Drive Technology: Heads, Media, Channel, Interfaces and Integration, IEEE, Inc., New York, 1997, pp. 142–46.

In addition, several disclosures specifically directed towards improved magnetic biasing within single stripe magnetoresistive (SSMR) sensor elements may also be found within the art of magnetoresistive (MR) sensor element fabrication. Included within such disclosures are: (1) Kuriyama, in U.S. Pat. No. 5,592,082 (a single stripe magnetoresistive (SSMR) sensor element employing a magnetoresistive (MR) layer having formed thereupon a series of patterned permanent magnet biasing layers which are formed at an angle of about 45 degrees with respect to a major axis of the magnetoresistive (MR) layer to attenuate noise within the magnetoresistive (MR) layer); and (2) Kung et al., in U.S. Pat. No. 5,680,281 (a single stripe magnetoresistive (MR) sensor element which may be magnetically biased employing only a uniaxial anisotropy of a magnetoresistive (MR) layer and a shape anisotropy of an active region of the magnetoresistive (MR) layer).

Further, several disclosures specifically directed towards improved magnetic biasing within soft adjacent layer (SAL) magnetoresistive (MR) sensor elements may also be found within the art of magnetic sensor element fabrication. Included within such disclosures are: (1) Chen et al., in U.S. Pat. No. 5,285,339 (a soft adjacent layer (SAL) magnetoresistive (MR) sensor element formed employing a magnetoresistive (MR) layer formed from a magnetic material having a low uniaxial magnetic anisotropy separated from a magnetic biasing soft adjacent layer (SAL) formed from a magnetic material having a high uniaxial magnetic anisotropy); (2) Chen et al., in U.S. Pat. No. 5,325,253 (a soft adjacent layer (SAL) magnetoresistive (MR) sensor element employing a pair of patterned antiferromagnetic magnetic biasing layers formed upon a pair of opposite ends of a magnetoresistive (MR) layer, where the pair of patterned antiferromagnetic magnetic biasing layers has a canted exchange bias field with respect to the magnetoresistive (MR) layer); and (3) Gill et al., in U.S. Pat. No. 5,508,866 (a soft adjacent layer (SAL) magnetoresistive (MR) sensor element where the soft adjacent layer (SAL) is further magnetically biased and stabilized by an antiferromagnetic magnetic bias layer of nickel oxide).

Finally, several disclosures which are directed more specifically towards dual stripe magnetoresistive (DSMR) sensor elements, and may include longitudinal magnetic biasing considerations of such dual stripe magnetoresistive (DSMR) sensor elements, may also be found within the art of magnetoresistive (MR) sensor element fabrication. Included within such disclosures are: (1) Smith, in U.S. Pat. No. 5,406,433 (a dual stripe magnetoresistive (DSM) sensor element where each magnetoresistive (MR) layer is fabricated with a height at least ten times a trackwidth of the dual stripe magnetoresistive (DSMR) sensor element, such that the dual stripe magnetoresistive (DSMR) sensor element may be employed for sensing magnetic signals of increased linear density and decreased track spacing); and (2) Shi et al., in U.S. Pat. No. 5,684,658 (a dual stripe magnetoresistive (DSMR) sensor element where a first trackwidth of a first magnetoresistve (MR) layer is physically offset from a second trackwidth of a second magnetoresistive (MR) layer, to provide in conjunction with an electromagnetic bias direction of the two magnetoresistive (MR) layers variable off-track performance characteristics of the dual stripe magnetoresistive (DSMR) sensor element).

Desirable within the art of longitudinal patterned exchange biased dual stripe magnetoresistive (DSMR) sensor element fabrication are additional methods and materials which may be employed for forming longitudinal patterned exchange biased dual stripe magnetoresistive (DSMR) sensor elements with enhanced magnetic bias uniformity of the longitudinal patterned exchange biased dual stripe magnetoresistive (DSMR) sensor elements within the trackwidths of the longitudinal patterned exchange biased dual stripe magnetoresistive (DSMR) sensor elements.

It is towards the foregoing object that the present invention is directed.

SUMMARY OF THE INVENTION

A first object of the present invention is to provide a longitudinal patterned exchange biased dual stripe magnetoresistive (DSMR) sensor element, and a method for fabricating the longitudinal patterned exchange biased dual stripe magnetoresistive (DSMR) sensor element, where the longitudinal patterned exchange biased dual stripe magnetoresistive (DSMR) sensor element has an enhanced magnetic bias profile uniformity within a trackwidth of the longitudinal patterned exchange biased dual stripe magnetoresistive (DSMR) sensor element.

A second object of the present invention is to provide a longitudinal patterned exchange biased dual stripe magnetoresistive (DSMR) sensor element and a method for fabricating the longitudinal patterned exchange biased dual stripe magnetoresistive (DSMR) sensor element in accord with the first object of the present invention, which method is readily commercially implemented.

In accord with the objects of the present invention, there is provided by the present invention a longitudinal patterned exchange biased dual stripe magnetoresistive (DSMR) sensor element and a method for fabricating the longitudinal patterned exchange biased dual stripe magnetoresistive (DSMR) sensor element. To practice the method of the present invention, there is first provided a substrate. There is then formed over the substrate a patterned first magnetoresistive layer. There is then formed contacting a pair of opposite ends of the patterned first magnetoresistive (MR) layer a pair of patterned first magnetic biasing layers, where the pair of patterned first magnetic biasing layers is biased in a first transverse magnetic bias direction substantially perpendicular with a first axis of the patterned first magnetoresistive (MR) layer which separates the pair of patterned first magnetic biasing layers. There is then formed separated from the patterned first magnetoresistive (MR) layer by a non-magnetic spacer layer a patterned second magnetoresistive (MR) layer. There is then formed contacting a pair of opposite ends of the patterned second magnetoresistive (MR) layer a pair of patterned second magnetic biasing layers separated by a second axis of the patterned second magnetoresistive (MR) layer which is substantially parallel with the first axis of the patterned first magnetoresistive (MR) layer, where the pair of patterned second magnetic biasing layers is biased in a second transverse magnetic bias direction substantially anti-parallel with the first transverse magnetic bias direction. Within the method of the present invention, the pair of patterned first magnetic biasing layers and the pair of patterned second magnetic biasing layers are formed of a single magnetic biasing material. Similarly, within the method of the present invention, the pair of patterned second magnetic biasing layers is biased employing a first thermal annealing method employing a first thermal annealing temperature, a first thermal annealing exposure time and a first extrinsic magnetic bias field strength such that the pair of patterned second magnetic biasing layers is biased in the second transverse magnetic bias direction while the pair of patterned first magnetic biasing layers is not substantially demagnetized from the first transverse magnetic bias direction while forming a pair of partially demagnetized patterned first magnetic biasing layers from the pair of patterned first magnetic biasing layers. Finally, there is then annealed thermally the substrate while employing a second thermal annealing method employing a second thermal annealing temperature, a second thermal annealing exposure time and a second extrinsic magnetic bias field substantially parallel with the first axis and the second axis such that the first transverse magnetic bias direction of the pair of partially demagnetized patterned first magnetic biasing layers is canted in the direction of the second extrinsic magnetic bias field to form a pair of canted partially demagnetized patterned first magnetic biasing layers and the second transverse bias direction of the patterned second magnetic biasing layers is canted in the direction of the second extrinsic magnetic bias field to form a pair of canted patterned second magnetic biasing layers.

The method of the present invention contemplates a magnetically biased dual stripe magnetoresistive (DSMR) sensor element fabricated in accord with the method of the present invention.

The present invention provides a magnetically biased dual stripe magnetoresistive (DSMR) sensor element, and a method for fabricating the magnetically biased dual stripe magnetoresistive (DSMR) sensor element, where the magnetically biased dual stripe magnetoresistive (DSMR) sensor element has an enhanced magnetic bias profile uniformity within a read trackwidth of the magnetically biased dual stripe magnetoresistive (DSMR) sensor element. The present invention realizes the foregoing object by employing when forming the magnetically biased dual stripe magnetoresistive (DSMR) sensor element a first magnetoresistive (MR) layer biased employing a pair of canted partially demagnetized patterned first magnetic biasing layers and a second magnetoresistive (MR) layer biased employing a pair of canted patterned second magnetic biasing layers, where the foregoing two pair of canted magnetic biasing layers are canted in opposite directions.

The method of the present invention is readily commercially implemented. The method of the present invention employs thermal annealing methods which are generally known in the art of magnetoresistive (MR) sensor element fabrication. Since it is a process control within the present invention which provides at least in part the method of the present invention, rather than the existence of methods and materials which provides the present invention, the method of the present invention is readily commercially implemented.

Advantageously, a magnetically biased dual stripe magnetoresistive (DSMR) sensor element formed in accord with the method of the present invention is formed with a pair of patterned first magnetic biasing layers and a pair of patterned second magnetic biasing layers formed of a single magnetic biasing material, since a pair of patterned second magnetic biasing layers is transversely magnetically biased in a second magnetic bias direction employing a thermal annealing method employing a thermal annealing temperature, a thermal annealing exposure time and an extrinsic magnetic bias field strength such that a pair of patterned first magnetic biasing layers is not appreciably demagnetized from a first magnetic bias direction antiparallel the second magnetic bias direction.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides a method for fabricating a magnetically biased dual stripe magnetoresistive (DSMR) sensor element, and a magnetically biased dual stripe magnetoresistive (DSMR) sensor element fabricated in accord with the method, where the magnetically biased dual stripe magnetoresistive (DSMR) sensor element is fabricated employing two pair of patterned magnetic biasing layers formed of a single magnetic biasing material, and where the two pair of patterned magnetic biasing layers bias a pair of patterned magnetoresistive (MR) layers in oppositely canted directions. Within the method of the method of the present invention, when transversely magnetically biasing a second pair of patterned magnetic biasing layers within the two pair of patterned magnetic biasing layers in a second transverse magnetic bias direction there is employed a thermal annealing method employing a thermal annealing temperature, a thermal annealing exposure time and an extrinsic magnetic bias field strength such that there is not appreciably demagnetized a first pair of patterned magnetic biasing layers which have previously been transversely magnetically biased in a first transverse magnetic bias direction antiparallel the second transverse magnetic bias direction.

Although the preferred embodiment of the present invention illustrates the present invention within the context of fabricating a merged inductive magnetic write dual stripe magnetoresistive (DSMR) read magnetic read-write head which is most likely to be employed within digitally encoded magnetic data storage and retrieval, a longitudinally magnetically biased dual stripe magnetoresistive (DSMR) sensor element fabricated in accord with the method of the present invention may be employed within magnetic sensor applications including but not limited to digital magnetic sensor applications and analog magnetic sensor applications employing magnetic heads including but not limited to merged inductive magnetic write dual stripe magnetoresistive (DSMR) read magnetic read-write heads, non-merged inductive magnetic write dual stripe magnetoresistive (DSMR) read magnetic read-write heads, and read only dual stripe magnetoresistive (DSMR) read heads.

Figure 1:
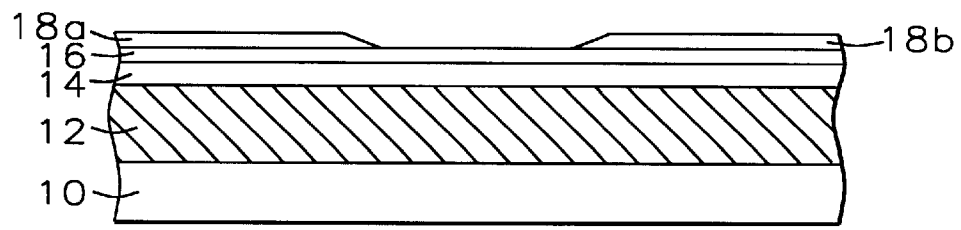
FIG. 1, FIG. 2, FIG. 3, FIG. 4, FIG. 5, FIG. 6 and FIG. 7 show a series of schematic air bearing surface (ABS) view and schematic perspective view diagrams illustrating the results of progressive stages in forming a merged inductive magnetic write dual stripe magnetoresistive (DSMR) read magnetic read-write head having formed therein a dual stripe magnetoresistive (DSMR) sensor element in accord with the present invention.

Referring now to FIG. 1 to FIG. 7, there is shown a series of schematic air bearing surface (ABS) view and schematic perspective view diagrams illustrating the results of progressive stages in fabrication of a merged inductive magnetic write dual stripe magnetoresistive (DSMR) read magnetic read-write head having fabricated therein a magnetically biased dual stripe magnetoresistive (DSMR) sensor element in accord with the present invention. Shown in FIG. 1 is a schematic air bearing surface (ABS) view diagram of the merged inductive magnetic write dual stripe magnetoresistive (DSMR) read magnetic read-write head at an early stage in its fabrication in accord with the method of the present invention.

Shown in FIG. 1 is a substrate 10 having formed thereupon a blanket first shield layer 12 which in turn has formed thereupon a blanket first non-magnetic spacer layer 14. Within the preferred embodiment of the present invention, the substrate 10, the blanket first shield layer 12 and the blanket first non-magnetic spacer layer 14 may be formed employing methods and materials as are conventional in the art of magnetoresistive (MR) sensor element fabrication.

For example, although it is known in the art of magnetoresistive (MR) sensor element fabrication that substrates are typically formed from non-magnetic ceramic materials such as but not limited to oxides, nitrides, borides, carbides and mixtures of oxides, nitrides, borides and carbides, for the preferred embodiment of the present invention, the substrate 10 is preferably formed from a non-magnetic aluminum oxide/titanium carbide ceramic material. Preferably, the substrate 10 so formed is formed with sufficient dimensions to allow the substrate 10 to be fabricated into a slider employed within a direct access storage device (DASD) magnetic data storage enclosure employed within digitally encoded magnetic data storage and retrieval, although, as noted above, a magnetoresistive (MR) sensor element formed in accord with the present invention may be employed within other digital magnetic data storage and transduction applications, as well as analog magnetic data storage and transduction applications.

Similarly, although it is also known in the art of magnetoresistive (MR) sensor element fabrication that shield layers may be formed from any of several soft magnetic materials, including but not limited to permalloy (ie: nickel-iron alloy) soft magnetic materials and higher order alloy soft magnetic materials incorporating permalloy soft magnetic materials (ie: nickel-iron-rhodium soft magnetic materials and nickel-iron-chromium soft magnetic materials), for the preferred embodiment of the present invention, the blanket first shield layer 12 is preferably formed of a permalloy (ie: nickel-iron 80:20 w/w) soft magnetic material or cobalt-niobium-hafnium soft magnetic material. Preferably, the blanket first shield layer 12 is formed to a thickness of from about 10000 to about 30000 angstroms.

Finally, within the preferred embodiment of the present invention with respect to the blanket first non-magnetic spacer layer 14, although the blanket first non-magnetic spacer layer 14 may be formed employing methods and materials as are conventional in the art of magnetoresistive (MR) sensor element fabrication, including but not limited to chemical vapor deposition (CVD) methods, plasma enhanced chemical vapor deposition (PECVD) methods and physical vapor deposition (PVD) sputtering methods through which may be formed non-magnetic spacer layers of non-magnetic spacer materials including but not limited to conductor non-magnetic spacer materials and dielectric non-magnetic spacer materials (such dielectric non-magnetic spacer materials including but not limited to silicon oxide dielectric materials, silicon nitride dielectric materials, nitrogenated carbon dielectric materials and aluminum oxide dielectric materials), for the preferred embodiment of the present invention, the blanket first non-magnetic spacer layer 14 is preferably formed of an aluminum oxide non-magnetic dielectric spacer material deposited employing a physical vapor deposition (PVD) sputtering method, as is most common in the art of magnetoresistive (MR) sensor element fabrication. Preferably, the blanket first non-magnetic spacer layer 14 so formed is formed to a thickness of from about 200 to about 2000 angstroms.

Although not completely illustrated within the schematic air-bearing surface (ABS) view diagram of FIG. 1, there is also shown within FIG. 1 formed upon the blanket first non-magnetic spacer layer 14 a patterned first magnetoresistive (MR) layer 16. Typically and preferably, the patterned first magnetoresistive (MR) layer 16 is formed from a magnetoresistive (MR) material analogous or equivalent to the soft magnetic material employed for forming the blanket first shield layer 12. Preferably, the patterned first magnetoresistive (MR) layer 16 is formed upon the blanket first non-magnetic spacer layer 14 from a permalloy (nickel-iron, 80:20, w/w) magnetoresistive material to a thickness of from about 60 to about 300 angstroms.

Finally, there is also shown within the schematic air-bearing surface (ABS) view diagram of FIG. 1 a pair of patterned first magnetic biasing layers 18a and 18b formed upon a pair of opposite ends of the patterned first magnetoresistive (MR) layer 16 to define a first trackwidth TWI of the patterned first magnetoresistive (MR) layer 16. Preferably, the first trackwidth TWI is from about 0.3 to about 3 microns. The pair of patterned first magnetic biasing layers 18a and 18b may be formed of antiferromagnetic magnetic biasing materials (such as but not limited to iron-manganese alloy antiferromagnetic magnetic biasing materials and nickel-manganese antiferromagnetic magnetic biasing materials).

Although not illustrated within the schematic air bearing surface (ABS) view diagram of FIG. 1, there is typically and preferably also formed coextensively upon the pair of patterned first magnetic biasing layers 18a and 18b a pair of patterned first conductor lead layers. Illustration of the pair of patterned first conductor lead layers is omitted from the schematic air bearing surface (ABS) view diagram of FIG. 1, in order to provide clarity. Typically and preferably, the pair of patterned first conductor lead layers may be formed immediately on top of the pair of patterned first magnetic biasing layers 18a and 18b while employing the same mask. Typically and preferably, each patterned first conductor lead layer is formed to a thickness of from about 200 to about 1000 angstroms while employing a conductor lead material as is conventional in the art of magnetoresistive (MR) sensor element fabrication, such a conductor lead material being selected from the group of conductor lead materials including but not limited to aluminum, aluminum alloy, copper, copper alloy, tungsten, tungsten alloy, gold and gold alloy conductor lead materials.

Finally, although the schematic air-bearing surface (ABS) view diagram of FIG. 1 illustrates the pair of patterned first magnetic biasing layers 18a and 18b formed upon the patterned first magnetoresistive layer 16, it is also feasible within the present invention that a pair of patterned first magnetic biasing layers, such as the pair of patterned first magnetic biasing layers 18a and 18b, either abuts or is formed beneath a patterned first magnetoresistive (MR) layer, such as the patterned first magnetoresistive (MR) layer 16, provided that the pair of patterned first magnetic biasing layers contacts a pair of opposite ends of the patterned first magnetoresistive (MR) layer to at least in part assist in defining a first trackwidth of the patterned first magnetoresistive (MR) layer.

Figure 2:
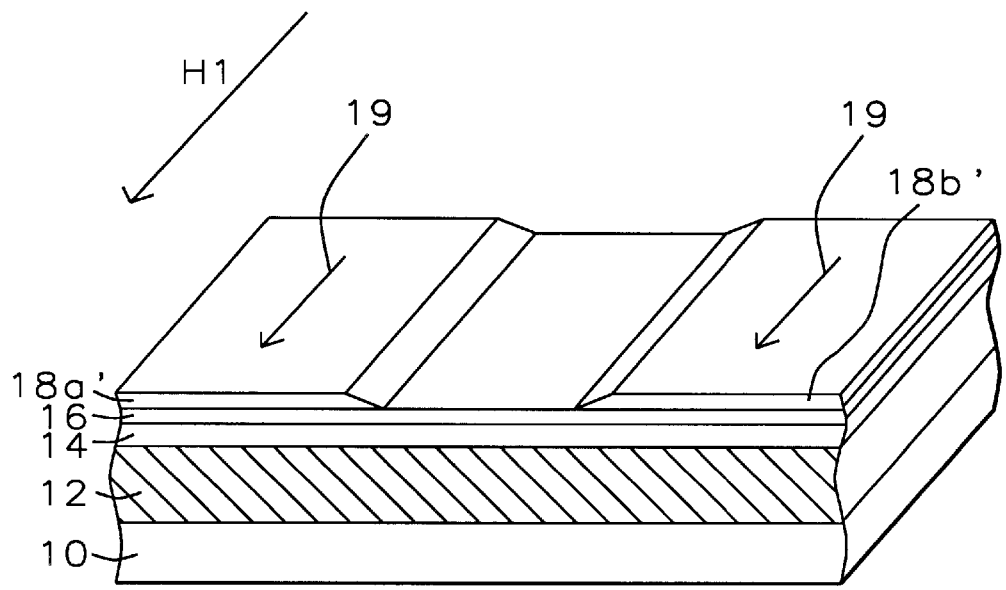

Referring now to FIG. 2, there is shown a schematic perspective view diagram illustrating the results of further processing of the merged inductive magnetic write dual stripe magnetoresistive (DSMR) read magnetic read-write head whose schematic air bearing surface (ABS) view diagram is illustrated in FIG. 1. Shown in FIG. 2 is a schematic perspective view diagram of a merged inductive magnetic write dual stripe magnetoresistive (DSMR) read magnetic read-write head otherwise equivalent to the merged inductive magnetic write dual stripe magnetoresistive (DSMR) read magnetic read-write head whose schematic air bearing surface (ABS) view diagram is illustrated in FIG. 1, but wherein the patterned first magnetic biasing layers 18a and 18b are transversely magnetically biased by thermal annealing under the influence of a first extrinsic magnetic bias field H1 to transversely magnetically bias the pair of patterned first magnetic biasing layers 18a and 18b in a direction substantially perpendicular with a major axis of the patterned first magnetoresistive (MR) layer 16 which separates the pair of patterned first magnetic biasing layers 18a and 18b, thus forming from the pair of patterned first magnetic biasing layers 18a and 18b a pair of transversely magnetically biased patterned first magnetic biasing layers 18a' and 18b'.

Although the preferred embodiment of the present invention illustrates the transverse magnetic biasing of the pair of patterned first magnetic biasing layers 18a and 18b to form the transversely magnetically biased patterned first magnetic biasing layers 18a' and 18b' by employing the first extrinsic magnetic bias field H1 while employing a thermal annealing method after forming the pair of patterned first magnetic biasing layers 18a and 18b, it is also feasible within the method of the present invention that the transversely magnetically biased patterned first magnetic biasing layers 18a' and 18b' may be formed directly incident to forming the patterned first magnetic biasing layers 18a and 18b within the first external magnetic bias field H1 when originally forming the pair of patterned first magnetic biasing layers 18a and 18b.

Within the preferred embodiment of the present invention, the transversely magnetically biased patterned first magnetic biasing layers 18a' and 18b' are preferably formed employing a thermal annealing method wherein the merged inductive magnetic write dual stripe magnetoresistive (DSMR) read magnetic read-write head whose schematic air bearing surface (ABS) view diagram is illustrated in FIG. 1 is thermally annealed within the first extrinsic magnetic bias field H1 of strength from about 100 to about 5000 oersteds for a time period of from about 1 to about 10 hours minutes and a temperature of about 290 to about 350 degrees centigrade, under circumstances where the patterned first magnetic biasing layers 18a and 18b are each formed of a nickel-manganese (50:50, w/w) antiferromagnetic longitudinal magnetic biasing material as is conventional in the art of magnetoresistive sensor element fabrication. More preferably, and although not specifically illustrated within the schematic cross-sectional diagram of FIG. 2, the transversely magnetically biased patterned first magnetic biasing layers 18a' and 18b' are preferably formed employing a thermal annealing method wherein the merged inductive magnetic write dual stripe magnetoresistive (DSMR) read magnetic read-write head whose schematic air bearing surface view diagram is illustrated in FIG. 1, but over which is formed a patterned second magnetoresistive (MR) layer, is thermally annealed within the first magnetic bias field H1 employing the above recited conditions. Under such circumstances both the patterned first magnetoresistive layer 16 and the patterned second magnetoresistive (MR) layer will experience equivalent levels of thermal annealing and thus most likely have matched and equivalent resistances.

Although the two identical arrows, 19, in the schematic perspective view diagram of FIG. 2 illustrates the substantially equal magnetizati on vectors of the transversely magnetically biased patterned first longitudinal magnetic biasing layers 18a' and 18b' nominally completely perpendicular with a major axis of the patterned magnetoresistive (MR) layer 16 which separates the pair of transversely magnetically biased patterned first magnetic biasing layers 18a' and 18b', it is understood by a person skilled in the art that the transversely magnetically biased patterned first magnetic biasing layers 18a' and 18b' will typically be at least substantially perpendicular to the major axis of the patterned first magnetoresistive (MR) layer 16 which separates the pair of transversely magnetic biased patterned first magnetic biasing layers 18a' and 18b'. Such substantial alignment is typical incident to thermal annealing methods and magnetically assisted deposition methods as are conventional in the art of magnetoresistive (MR) sensor element fabrication. Similarly, although the schematic perspective view of FIG. 2 illustrates the transverse magnetic biasing of the pair of transversely magnetically biased patterned first magnetic biasing layers 18a' and 18b' typically and preferably within a plane parallel to the plane of the patterned magnetoresistive (MR) layer 16, there may occasionally, but not desirably, be some divergence from that plane incident to variations within thermal annealing methods and magnetically assisted deposition methods as are conventional in the art of magnetoresistive (MR) sensor element fabrication.

Figure 3:
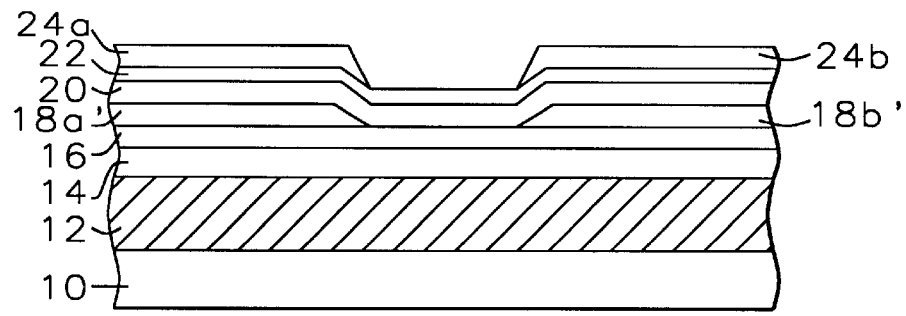

Referring now to FIG. 3, there is shown a schematic air bearing surface (ABS) view diagram illustrating the results of further processing of the merged inductive magnetic write dual stripe magnetoresistive (DSMR) read magnetic read-write head whose schematic perspective view diagram is illustrated in FIG. 2. Shown in FIG. 3 is a schematic air bearing surface (ABS) view diagram of a merged inductive magnetic write dual stripe magnetoresistive (DSMR) read magnetic write-head otherwise equivalent to the merged inductive magnetic write dual stripe magnetoresistive (DSMR) read magnetic read-write head whose schematic perspective view diagram is illustrated in FIG. 2, but wherein: (1) there is formed upon the pair of transversely magnetically biased patterned first magnetic biasing layers 18a' and 18b' and upon the first trackwidth TW1 of the patterned first magnetoresistive (MR) layer 16 a blanket second nonmagnetic spacer layer 20; (2) there is formed upon the blanket second non-magnetic spacer layer a patterned second magnetoresistive (MR) layer 22; and (3) there is formed upon the patterned second magnetoresistive (MR) layer 22 a pair of patterned second magnetic biasing layers 24a and 24b which define a second trackwidth TW2 of the patterned second magnetoresistive (MR) layer 22. Preferably, the second trackwidth TW2 is of a width and alignment corresponding with the first trackwidth TW1. Similarly, although not specifically illustrated within the schematic air bearing surface (ABS) view diagram of FIG. 3, the patterned second magnetoresistive (MR) layer 22 is preferably, although not necessarily, substantially aligned with the patterned first magnetoresistive (MR) layer 16.

Within the preferred embodiment of the present invention, the blanket second non-magnetic spacer layer 20 is preferably formed employing methods, materials and dimensions analogous or equivalent to the methods, materials and dimensions employed for forming the blanket first non-magnetic spacer layer 14. Similarly, within the preferred embodiment of the present invention, the patterned second magnetoresistive (MR) layer 22 is preferably formed employing methods, materials and dimensions analogous or equivalent to the methods, materials and dimensions employed for forming the patterned first magnetoresistive (MR) layer 16. Finally, within the preferred embodiment of the present invention, the pair of patterned second magnetic biasing layers 24a and 24b is preferably formed employing methods, materials and dimensions analogous or equivalent to the methods, materials and dimensions employed for forming the pair of patterned first magnetic biasing layers 18a and 18b. In particular, the pair of patterned second magnetic biasing layers 24a and 24b and the pair of patterned first magnetic biasing layers 18a and 18b are formed of a single magnetic biasing material. Analogously with the patterned first magnetic biasing layers 18a and 18b, and similarly also not illustrated within the schematic air bearing surface (ABS) view diagram of FIG. 3, the pair of patterned second magnetic biasing layers 24a and 24b also preferably has formed and aligned thereupon, while similarly also preferably employing a lift off method, a pair of patterned second conductor lead layers.

Figure 4:
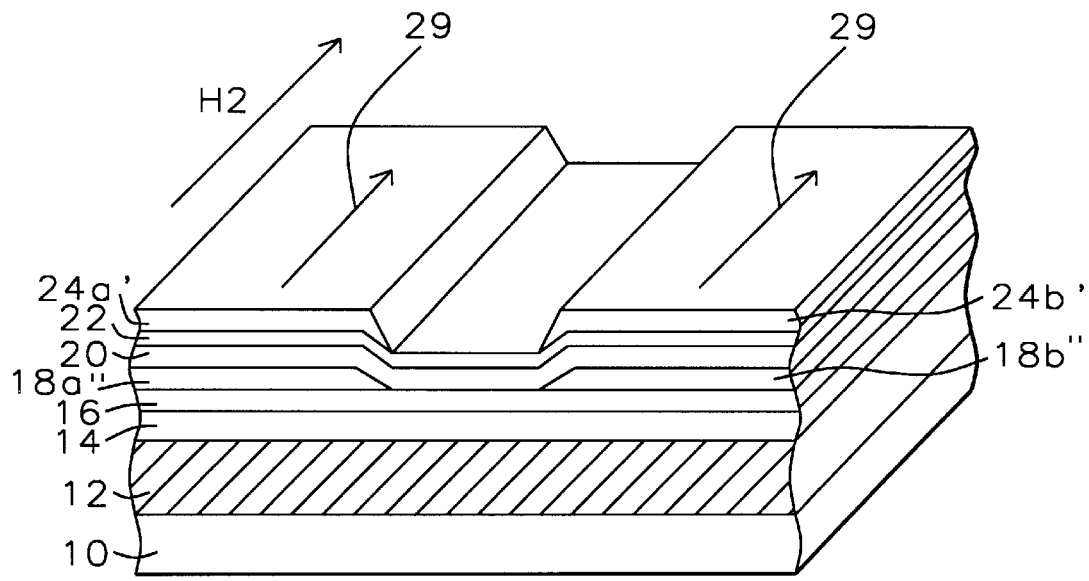

Referring now to FIG. 4, there is shown a schematic perspective view diagram illustrating the results of further processing of the merged inductive magnetic write dual stripe magnetoresistive (DSMR) read magnetic read-write head whose schematic air bearing surface (ABS) view diagram is illustrated in FIG. 3. Shown in FIG. 4 is a schematic perspective view diagram of a merged inductive magnetic write dual stripe magnetoresistive (DSMR) read magnetic read-write head otherwise equivalent to the merged inductive magnetic write dual stripe magnetoresistive (DSMR) read magnetic read-write head whose schematic air bearing surface (ABS) view diagram is illustrated in FIG. 3, but wherein the patterned second magnetic biasing layers 24a and 24b have been transversely magnetically biased while employing a second extrinsic magnetic bias field H2 anti-parallel to the first extrinsic magnetic bias field Hi as illustrated within the schematic perspective view diagram of FIG. 2, to provide the transversely magnetically biased patterned second magnetic biasing layers 24a' and 24b'.

Within the preferred embodiment of the present invention, the two arrows, 29, represent the substantially equal magnetization vectors of the patterned second magnetic biasing layers 24a and 24b which are transversely magnetically biased substantially anti-parallel with respect to the transversely magnetically biased patterned first magnetic biasing layers 18a' and 18b' as illustrated in FIG. 2, while employing a second thermal annealing method which employs a second thermal annealing temperature and a second thermal annealing exposure time, in conjunction with the second extrinsic magnetic bias field H2 of appropriate magnetic strength, such that the pair of patterned second magnetic biasing layers 24a and 24b is transversely magnetically biased to form the pair of transversely magnetically biased patterned second magnetic biasing layers 24a' and 24b' while not substantially de-magnetizing the pair of transversely magnetically biased patterned first biasing layers 18a' and 18b' which then form a pair of partially demagnetized transversely magnetically biased patterned first magnetic biasing layers 18a" and 18b", as illustrated within the schematic perspective view diagram of FIG. 4.

For the preferred embodiment of the present invention when both the pair of patterned first magnetic biasing layers 18a and 18b, as well as the pair of patterned second magnetic biasing layers 24a and 24b, are formed of a nickel-manganese alloy (50:50, w/w) antiferromagnetic magnetic biasing material, the pair of patterned second magnetic biasing layers is preferably thermally annealed at a second thermal annealing temperature of from about 260 to about 290 degrees centigrade for a second thermal annealing exposure time period of from about 0.5 to about 5 hours within the extrinsic second magnetic bias field H2 of strength about 100 to about 5000 oersteds.

Within the present invention, it is preferred that the pair of transversely magnetically biased patterned first magnetic biasing layers 18a' and 18b' not be demagnetized when forming the pair of partially demagnetized transversely magnetically biased patterned first magnetic biasing layers 18a" and 18b" incident to forming the pair of transversely magnetically biased patterned second magnetic biasing layers 24a' and 24b' from the pair of patterned second magnetic biasing layers 24a and 24b. Thus, within the present invention, there is exploited at an appropriate second thermal annealing temperature, second thermal annealing exposure time and second magnetic bias field H2 strength a more facile magnetization of a pair of unmagnetized patterned second magnetic biasing layers 24a and 24b in comparison with a less facile demagnetization of a pair of transversely magnetically biased patterned first magnetic biasing layers 18a' and 18b'.

Figure 5:
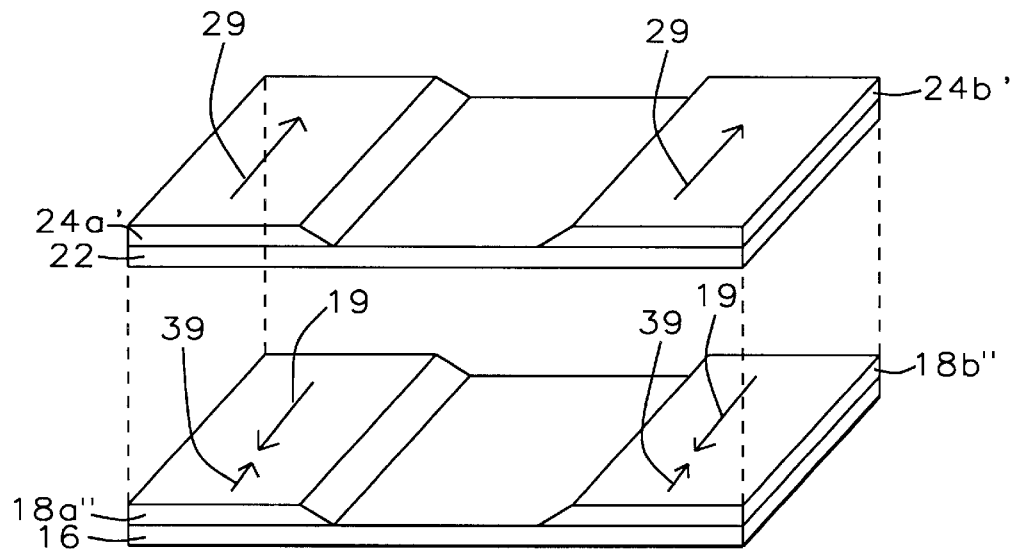

Referring now to FIG. 5, there is shown an exploded schematic perspective view diagram of a merged inductive magnetic write dual stripe magnetoresistive (DSMR) read magnetic read write head corresponding with the schematic perspective view diagram of the merged inductive magnetic write dual stripe magnetoresistive (DSMR) read magnetic read-write head whose schematic perspective view diagram is illustrated in FIG. 4. Also shown on the diagram are the magnetization vectors, 19, of the first magnetic biasing layers, 18a" and 18b", the magnetization vectors, 29, of the second magnetic biasing layers 24a' and 24b', and the additional magnetization vector, 39, produced in 18a" and 18b" by the second thermal anneal of layers 24a' and 24b'.

Shown in FIG. 5 is an exploded schematic perspective view diagram illustrating the patterned first magnetoresistive (MR) layer 16 having formed upon a pair of its opposite ends the pair of partially demagnetized transversely magnetically biased patterned first magnetic biasing layers 18a" and 18b", where the patterned first magnetoresistive (MR) layer 16 has aligned superimposed thereupon the patterned second magnetoresistive layer 22 which has formed upon a corresponding pair of its opposite ends the pair of transversely magnetically biased patterned second magnetic biasing layers 24a' and 24b'. All of the remaining layers within the merged inductive magnetic write dual stripe magnetoresistive (DSMR) read magnetic read-write head whose schematic perspective view diagram is illustrated in FIG. 4 have been omitted solely for purposes of clarity.

Figure 6:
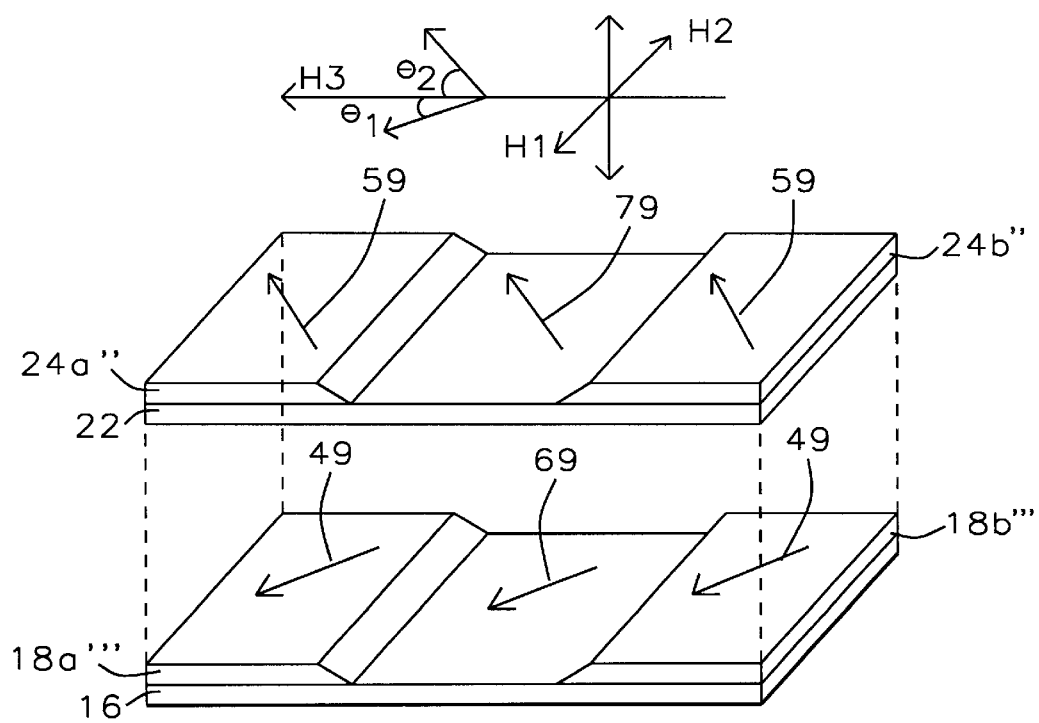

Referring now to FIG. 6, there is shown an exploded schematic perspective view diagram illustrating the results of further processing of the merged inductive magnetic write dual stripe magnetoresistive (DSMR) read magnetic read-write head whose exploded schematic perspective view diagram is illustrated in FIG. 5. Also shown are arrows, 49, 59, 69 and 79, representing the canted magnetizations of the first magnetic biasing layers 18a''' and 18b''', the second magnetic biasing layers, 24a" and 24b", the first magnetoresistive layer, 16 and the second magnetoresistive layer 22. The process by which this canting is achieved is discussed below.

Shown in FIG. 6 is an exploded schematic perspective view diagram of a merged inductive magnetic write dual stripe magnetoresistive (DSMR) read magnetic read-write head corresponding with the exploded schematic perspective view diagram of the merged inductive magnetic write dual stripe magnetoresistive (DSMR) read magnetic read-write head whose exploded schematic perspective view diagram is illustrated in FIG. 5, but wherein the merged inductive magnetic write dual stripe magnetoresistive (DSMR) read magnetic read write head has been thermally annealed employing a third thermal annealing method employing a third extrinsic magnetic bias field H3 of direction parallel with the major axis of the patterned first magnetoresistive (MR) layer 16 which separates the pair of partially demagnetized transversely magnetically biased patterned magnetic biasing layers 18a" and 18b" or the corresponding parallel major axis of the patterned second magnetoresistive (MR) layer 22 which separates the pair of transversely magnetically biased patterned second magnetic biasing layers 24a' and 24b' to form therefrom a corresponding pair of canted partially demagnetized transversely magnetically biased patterned magnetic biasing layers 18a''' and 18b''', in conjunction with a pair of canted transversely magnetically biased patterned magnetic biasing layers 24a" and 24b".

Similarly with the second thermal annealing method, within the preferred embodiment of the present invention, the third thermal annealing method employs a third thermal annealing temperature, a third thermal annealing exposure time and a third extrinsic magnetic bias field H3 strength such that the pair of canted partially demagnetized transversely magnetically biased patterned first magnetic biasing layers 18a''' and 18b''' are not fully aligned with the third extrinsic magnetic bias field H3 direction. Rather, as illustrated within the exploded schematic perspective view diagram of FIG. 6, the pair of canted partially demagnetized transversely magnetically biased patterned first magnetic biasing layers 18a''' and 18b''' are magnetized in a first direction which forms an angle $\Theta_1$ with respect to the third extrinsic magnetic bias field H3 direction. Similarly, as illustrated within the exploded schematic perspective view diagram of FIG. 6, the canted transversely magnetic biased patterned second magnetic biasing layers 24a'' and 24b'' are also not fully aligned with the third extrinsic magnetic bias field H3 direction but rather, as illustrated within the exploded schematic perspective view diagram of FIG. 6, they are magnetized in a second direction which forms an angle $\Theta_2$ with respect to the third extrinsic magnetic bias field H3 direction. The first direction and the second direction induce, as illustrated within the exploded schematic perspective view diagram of FIG. 6, corresponding magnetic alignments within the patterned first magnetoresistive (MR) layer 16 and the patterned second magnetoresistive (MR) layer 22. Preferably, the third thermal annealing method employs: (1) a third thermal annealing temperature of from about 200 to about 260 degrees centigrade; (2) a third thermal aneling exposure time of from about 5 to about 20 hours; and (3) a third extrinsic magnetic bias field H3 strength of from about 1000 to about 5000 oersteds.

Within the preferred embodiment of the present invention, the angle $\Theta_1$ preferably equals the angle $\Theta_2$ and they are thus complementary, and each of the angle $\Theta_1$ and the angle $\Theta_2$ is from about 25 to about 60 degrees with respect to the extrinsic third magnetic bias field H3 direction.

Figure 7:
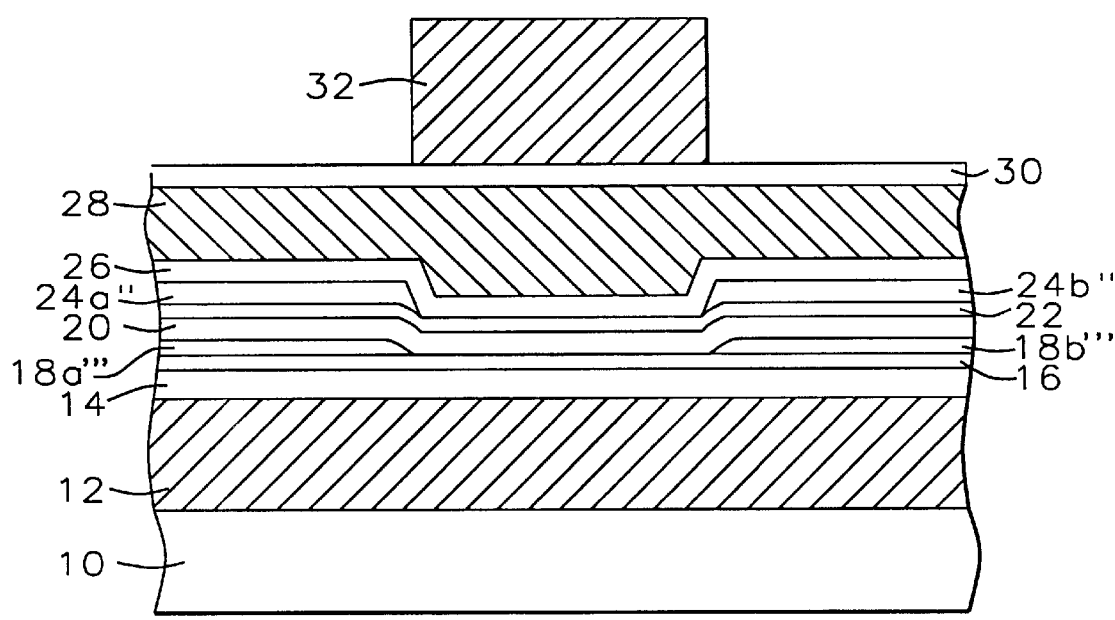

Referring now to FIG. 7, there is shown a schematic air bearing surface (ABS) view diagram illustrating the results of further processing of the merged inductive magnetic write dual stripe magnetoresistive (DSMR) read magnetic read-write head whose exploded schematic perspective view diagram is illustrated in FIG. 6.

Shown in FIG. 7 is a schematic air bearing surface (ABS) view diagram of a merged inductive magnetic write dual stripe magnetoresistive (DSMR) read magnetic read-write head otherwise equivalent to the merged inductive magnetic write dual stripe magnetoresistive (DSMR) read magnetic read-write head whose exploded schematic perspective view diagram is illustrated in FIG. 6, but wherein: (1) there is formed upon the pair of canted transversely magnetically biased patterned second magnetic biasing layers 24a'' and 24b'' and the second trackwidth TW2 of the patterned second magnetoresistive layer 22 a blanket third non-magnetic spacer layer 26; (2) there is formed upon the blanket third non-magnetic spacer layer 26 a blanket second shield layer 28 which simultaneously serves as a blanket first magnetic inductor write pole layer; (3) there is formed upon the blanket second shield layer 28 a blanket fourth non-magnetic write gap filling spacer layer 30; (4) there is formed upon the blanket fourth non-magnetic write gap filling spacer layer 30 a patterned second magnetic inductor write pole layer 32.

Within the preferred embodiment of the present invention, the blanket third non-magnetic spacer layer 26 is preferably formed employing methods, materials and dimensions analogous or equivalent to the methods, materials and dimensions employed for forming the blanket second non-magnetic spacer layer 20 and the blanket first non-magnetic spacer layer 14. Similarly, within the preferred embodiment of the present invention the blanket second shield layer 28 is preferably formed employing methods, materials and dimensions analogous or equivalent to the methods, materials and dimensions employed for forming the blanket first shield layer 12. Yet similarly, for the preferred embodiment of the present invention, the blanket fourth non-magnetic write gap filling spacer layer 30 is preferably formed employing methods, materials and dimensions analogous or equivalent to the methods, materials and dimensions employed for forming the blanket third non-magnetic spacer layer 26, the blanket second non-magnetic spacer layer 20 and the blanket first non-magnetic spacer layer 14. Finally, within the preferred embodiment of the present invention, the patterned second magnetic inductor write pole layer 32 is preferably formed employing methods materials and thickness dimensions analogous or equivalent to the methods, materials and thickness dimensions employed for forming the blanket second shield layer 28, but of a narrower width dimension in the range of from about 1 to about 4 microns to correspond with the first trackwidth TW1 of the patterned first magnetoresistive layer 16 and the second trackwidth TW2 of the patterned second magnetoresistive (MR) layer 22.

Upon forming the merged inductive magnetic write dual stripe magnetoresistive (DSMR) read magnetic read-write head whose schematic air bearing surface (ABS) view diagram is illustrated in FIG. 7, there is formed a merged inductive magnetic write dual stripe magnetoresistive (DSMR) read magnetic read-write head with enhanced magnetic bias profile uniformity within the trackwidth of the merged inductive magnetic write dual stripe magnetoresistive (DSMR) read magnetic read-write head. The merged inductive magnetic write dual stripe magnetoresistive (DSMR) read magnetic read-write head of the present invention realizes the foregoing object by employing complementary canted magnetic biasing of two pair of patterned magnetic biasing layers which magnetically bias a pair of patterned magnetoresistive (MR) layers within the merged inductive magnetic write dual stripe magnetoresistive (DSMR) read magnetic read-write head. The two pair of patterned magnetic biasing layers are formed of a single magnetic biasing material. Similarly, the method of the present invention employs when forming a pair of magnetically biased patterned second magnetic biasing layers upon a patterned second magnetoresistive (MR) layer a thermal annealing method employing: (1) a thermal annealing temperature; (2) a thermal annealing exposure time; and (3) an extrinsic magnetic bias field strength, such that the pair of magnetically biased patterned second magnetic biasing layers is magnetically biased while not substantially de-magnetizing a pair of magnetically biased patterned first magnetic biasing layers from a first transverse magnetic bias direction anti-parallel to a second transverse magnetic bias direction of the magnetically biased patterned second magnetic biasing layers.

As is understood by a person skilled in the art, the preferred embodiment of the present invention is illustrative of the present invention rather than limiting of the present invention. Revisions and modifications may be made to materials, structures and dimensions through which is provided a dual stripe magnetoresistive (DSMR) sensor element in accord with the preferred embodiment of the present invention while still providing a dual stripe magnetoresistive (MR) sensor element in accord with the spirit and scope of the present invention, as defined by the following claims.

What is claimed is:

1. A dual-stripe magnetoresistive sensor element comprising:
   a substrate;
   a patterned first magnetoresistive (MR) layer formed over the substrate;
   a pair of longitudinally separated magnetically biased patterned first magnetic biasing layers formed contacting a pair of opposite ends of the patterned first magnetoresistive (MR) layer;
   a patterned second magnetoresistive (MR) layer separated vertically from the patterned first magnetoresistive (MR) layer by at least a non-magnetic spacer layer; and
   a pair of longitudinally separated magnetically biased patterned second magnetic biasing layers formed contacting a pair of opposite ends of the patterned second magnetoresistive (MR) layer, wherein:
   the pair of magnetically biased patterned second magnetic biasing layers and the pair of magnetically biased patterned first magnetic biasing layers are formed of the same magnetically biasing material; and
   a second magnetic bias direction within the pair of magnetically biased patterned second magnetic biasing layers makes a second angle with the longitudinal direction and a first magnetic bias direction within the pair of magnetically biased patterned first magnetic biasing layers makes a first angle with the longitudinal direction, where the first angle and the second angle are complementary and are oppositely directed relative to the longitudinal direction.

2. The dual strip magnetoresistive (DSMR) sensor element of claim 1 wherein the dual stripe magnetoresistive (DSMR) sensor element is employed within a magnetic head selected from the group consisting of merged inductive magnetic write dual stripe magnetoresistive (DSMR) read magnetic heads, non-merged inductive magnetic write dual stripe magnetoresistive (DSMR) read magnetoresistive (MR) heads and dual stripe magnetoresistive (DSMR) read only heads.

3. A magnetic data storage enclosure having fabricated therein the magnetic head of claim 2.

4. The dual stripe magnetoresistive (DSMR) sensor element of claim 1 wherein the magnetic biasing material is an antiferromagnetic magnetic biasing material.

5. The dual stripe magnetoresistive (DSMR) sensor element of claim 1 wherein the patterned first magnetoresistive (MR) layer and the patterned second magnetoresistive (MR) layer have the same resistance.

6. The dual stripe magnetoresistive (DSMR) sensor element of claim 1 wherein the first angle is from about 25 to about 60 degrees.

* * * * *